US012421927B2

(12) United States Patent
Michalek et al.

(10) Patent No.: US 12,421,927 B2
(45) Date of Patent: Sep. 23, 2025

(54) CLEANING, MAINTAINING, REFURBISHING, AND/OR DIAGNOSING ENGINE COMPONENTS INCLUDING FUEL-INJECTORS

(71) Applicant: Daimler Truck North America LLC, Portland, OR (US)

(72) Inventors: John Joseph James Michalek, Dexter, MI (US); John McNeill, Belle River (CA)

(73) Assignee: Daimler Truck North America LLC, Portland, OR (US)

( * ) Notice: Subject to any disclaimer, the term of this patent is extended or adjusted under 35 U.S.C. 154(b) by 0 days.

(21) Appl. No.: 18/488,869

(22) Filed: Oct. 17, 2023

(65) Prior Publication Data

US 2024/0117785 A1 Apr. 11, 2024

Related U.S. Application Data

(63) Continuation of application No. 17/849,261, filed on Jun. 24, 2022, now Pat. No. 11,828,259.

(51) Int. Cl.
*F02M 65/00* (2006.01)
*B08B 9/032* (2006.01)

(52) U.S. Cl.
CPC ......... *F02M 65/008* (2013.01); *B08B 9/0321* (2013.01)

(58) Field of Classification Search
CPC ............... F02M 65/008; F02M 65/007; F02M 2200/05; B08B 9/0321
(Continued)

(56) References Cited

U.S. PATENT DOCUMENTS 4,520,773 A * 6/1985 Koslow ................ F02M 65/001 134/123
4,606,311 A * 8/1986 Reyes ..................... F02B 77/04 134/123
(Continued)

FOREIGN PATENT DOCUMENTS

DE 102006037471 A1 3/2008
GB 2117048 A * 10/1983 .............. F02B 77/04
(Continued)

OTHER PUBLICATIONS

International Search Report and Written Opinion received for PCT Patent Application No. PCT/US2023/026137, mailed on Nov. 13, 2023, 17 pages.
(Continued)

*Primary Examiner* — Michael E Barr
*Assistant Examiner* — Thomas Bucci
(74) *Attorney, Agent, or Firm* — ArentFox Schiff LLP

(57) ABSTRACT

Cleaning, maintaining, refurbishing, and/or diagnosing engine components including fuel system components, e.g., such as fuel-injectors. In one embodiment, a method of cleaning a fuel system component is provided. The method includes supplying a cleaning solution through the fuel system component, discontinuing the supplying of the cleaning solution, repeating the supplying of the cleaning solution and the discontinuing of the supplying of the cleaning solution a plurality of times, decoupling the source of cleaning solution, and connecting a source of fuel to the fuel system component, and supplying fuel through the fuel system component to re-establish fuel-based operation. In additional embodiments, a method of processing a fuel system component while it remains connected to an engine assembly, and a method of diagnosing a defective fuel system component, are provided.

10 Claims, 8 Drawing Sheets

(58) Field of Classification Search
USPC ........................................................ 134/166 R
See application file for complete search history.

(56) References Cited

U.S. PATENT DOCUMENTS

| | | | | |
|---|---|---|---|---|
| 4,877,043 | A * | 10/1989 | Carmichael | F02B 77/04 134/57 R |
| 4,909,207 | A * | 3/1990 | Takano | F02M 65/008 510/491 |
| 4,989,561 | A * | 2/1991 | Hein | F02B 77/04 134/30 |
| 5,339,845 | A * | 8/1994 | Huddas | F01D 25/002 134/169 R |
| 5,503,683 | A * | 4/1996 | Butcher | F02M 65/008 134/22.12 |
| 5,698,043 | A * | 12/1997 | Acevedo | F02M 65/008 134/22.12 |
| 5,826,602 | A * | 10/1998 | Chen | F02B 77/04 123/198 A |
| 10,683,799 | B2 * | 6/2020 | Datar | C11D 7/261 |
| 11,828,259 | B1 * | 11/2023 | Michalek | B08B 9/0321 |
| 2008/0295492 | A1 * | 12/2008 | Karkkainen | F01N 3/025 60/273 |
| 2009/0078227 | A1 | 3/2009 | Aradi et al. | |
| 2010/0084489 | A1 * | 4/2010 | Chang | F02M 53/043 123/456 |
| 2010/0212640 | A1 * | 8/2010 | Lucido | F02D 41/2432 123/516 |
| 2011/0226213 | A1 * | 9/2011 | Horriat | F02M 65/007 123/198 A |
| 2012/0055514 | A1 * | 3/2012 | Vince | F02M 65/008 134/22.18 |
| 2018/0258895 | A1 * | 9/2018 | Rodriguez | B08B 7/028 |
| 2018/0313265 | A1 * | 11/2018 | Datar | F02M 65/008 |
| 2020/0024536 | A1 | 1/2020 | Shanahan et al. | |
| 2020/0182147 | A1 | 6/2020 | Datar et al. | |
| 2020/0248089 | A1 | 8/2020 | Shanahan et al. | |

FOREIGN PATENT DOCUMENTS

| | | | | |
|---|---|---|---|---|
| GB | 2134178 | A * | 8/1984 | F02B 77/04 |
| GB | 2521169 | A * | 6/2015 | C10L 1/04 |
| GB | 2521275 | A * | 6/2015 | F02D 33/003 |
| GR | 20160100054 | A | 10/2017 | |
| WO | WO-9114518 | A1 * | 10/1991 | |
| WO | WO-9203641 | A1 * | 3/1992 | |
| WO | 93/25888 | A1 | 12/1993 | |
| WO | WO-9726093 | A1 * | 7/1997 | B08B 9/0323 |
| WO | WO-2005078259 | A1 * | 8/2005 | B08B 9/0321 |
| WO | 2016/122911 | A1 | 8/2016 | |

OTHER PUBLICATIONS

Invitation to Pay Additional Fees received for PCT Application No. PCT/US2023/026137, dated Sep. 21, 2023, 13 pages.

Office Action received for Canadian Patent Application No. 3166253, dated Sep. 25, 2023, 6 pages.

International Preliminary Report on Patentability received for PCT Patent Application No. PCT/US2023/026137, mailed on Jan. 2, 2025, 12 pages.

* cited by examiner

CLEANING, MAINTAINING, REFURBISHING, AND/OR DIAGNOSING ENGINE COMPONENTS INCLUDING FUEL-INJECTORS

CROSS-REFERENCE TO RELATED APPLICATIONS AND PRIORITY CLAIM

This non-provisional patent application is a continuation of co-pending U.S. patent application Ser. No. 17/849,261, filed on Jun. 24, 2022, and titled "CLEANING, MAINTAINING, REFURBISHING, AND/OR DIAGNOSING ENGINE COMPONENTS INCLUDING FUEL-INJECTORS" the contents of which is incorporated herein by reference in the entirety.

TECHNICAL FIELD

The field relates to cleaning, maintenance, and refurbishment of engine components.

BACKGROUND

Internal combustion engines often operate using fuel injection. Typical fuel injection systems use a fuel-injector or multiple fuel-injectors to supply fuel to an engine during its operation. The constant flow of fuel through these components can over time produce deposits inside the components that can impact efficiency, function, and durability. In addition, the use of certain types of fuels, e.g., bio-based fuels such as bio-diesel fuels, can further increase the rate that these deposits develop. The use of low quality fuel or the operation of an engine at excessive temperatures can also increase the rate that these deposits develop. This can limit performance and durability, and increase the cost of maintenance, among other issues.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, embodiments that enable cleaning, maintaining, refurbishing, and/or diagnosing engine components including fuel-system components, e.g., such as fuel-injectors. The processes described herein can also be used on components that remain at least partially installed or operably connected, e.g., to an associated engine assembly. For example, the processes described herein can be used on a fuel-injector that remains attached to an engine assembly in an operational configuration such that it can inject fuel into combustion components of the attached engine assembly. The processes described herein can also allow fuel system components that are defective or inoperable to be more easily identified for repair, replacement, and/or disposal. These processes can thus increase the efficiency and effectiveness of cleaning, maintaining, refurbishing, and/or diagnosing engine components including fuel system components, while additionally limiting the cost and time required to do so, among other benefits.

In one embodiment, a method for cleaning a fuel system and/or components thereof is provided. The method may include coupling a source of cleaning solution to a fuel system component, e.g., such as a fuel-injector, supplying the cleaning solution through the fuel system component, e.g., at a first pressure and for a first period of time, and subsequent to supplying the cleaning solution through the fuel system component, e.g., at the first pressure and for the first period of time, discontinuing the supplying of the cleaning solution through the fuel system component, e.g., for a second period of time, repeating the supplying and discontinuing of the cleaning solution a plurality of times, and then de-coupling the source of cleaning solution from the fuel system component, and coupling a source of fuel to the fuel system component, and then subsequent to coupling the source of fuel to the fuel system component, supplying the fuel through the fuel system component, e.g., at a second pressure and for a third period of time, e.g., to re-establish operational fuel flow through the fuel system component. This process can further be performed using a cleaning solution that includes a mixture of water, a solvent (e.g., alcohol, such as butoxyethanol, which can dissolve deposits and enhance the expulsion of water), and a corrosion-inhibitor (e.g., a rust-inhibitor, which can limit corrosion of components subsequent to performing cleaning processes that use water). This cleaning process is demonstrated through testing to enhance the removal of deposits from engine components, while also inhibiting corrosion in such components subsequent to the processes being performed, among other benefits.

In another embodiment, a method of cleaning, maintaining, refurbishing, and/or diagnosing a fuel system component, e.g., such as a fuel-injector, while the fuel system component remains at least partially installed or operably connected, e.g., to an engine assembly, is provided. The method includes coupling a source of cleaning solution to the fuel system component, supplying the cleaning solution through the fuel system component such that it travels through a first fluid-pathway, e.g., one that passes into, through, and then out of the fuel system component, while bypassing at least part of a second fluid-pathway that otherwise introduces fuel into combustion components of the connected engine assembly. Depending on the configuration of the fuel system component, the passage of the cleaning solution through the desired fluid-pathway can be controlled using different techniques, e.g., by controlling the pressure of the cleaning solution supplied through the fuel system component, and/or by operating components of the fuel system component, e.g., an electrical circuit, linear actuator, solenoid, or other connected component, among other techniques. This allows a cleaning process to be performed with limited decoupling, disconnection, and/or disassembly of fuel system components, and can also allow for detection of defective fuel system components, thereby increasing the speed, efficiency, and effectiveness of cleaning, maintaining, refurbishing, and/or diagnosing fuel system components, among other benefits.

BRIEF DESCRIPTION OF THE DRAWINGS

The present embodiments suitable for cleaning, maintaining, refurbishing, and/or diagnosing engine components including fuel system components are described in detail in connection with the attached figures which illustrate non-limiting examples of the disclosed subject matter, in which.

DETAILED DESCRIPTION

This detailed description is provided in order to meet statutory requirements. However, this description is not intended to limit the scope of the invention described herein. Rather, the claimed subject matter may be embodied in different ways, e.g., to include different steps, different combinations of steps, different elements, and/or different combinations of elements, similar to those described in this disclosure, and in conjunction with other present or future technologies and/or techniques. The terms "step" and "block" may be used herein to identify different elements of methods employed, but these terms should not be interpreted as implying any particular order among or between different elements except when such order is explicitly stated.

In general, processes for cleaning, maintaining, refurbishing, and/or diagnosing engine components, e.g., fuel system components, that allow for doing so with increased efficiency, effectiveness, and with reduced cost, are disclosed herein. In some aspects, these processes can be performed without disconnecting the components from their associated engine assemblies, or with reduced need to do so. This allows engine components, including fuel system components, to be cleaned, maintained, refurbished, and/or diagnosed with greater efficiency, effectiveness, and simplicity, and with reduced cost. The processes described herein can be used with internal combustion engines, e.g., gasoline-powered or diesel-powered internal combustion engines, including those that use standard petroleum-based fuel, and/or those that use bio-derived fuels, or some combination of the same.

Figure 1:
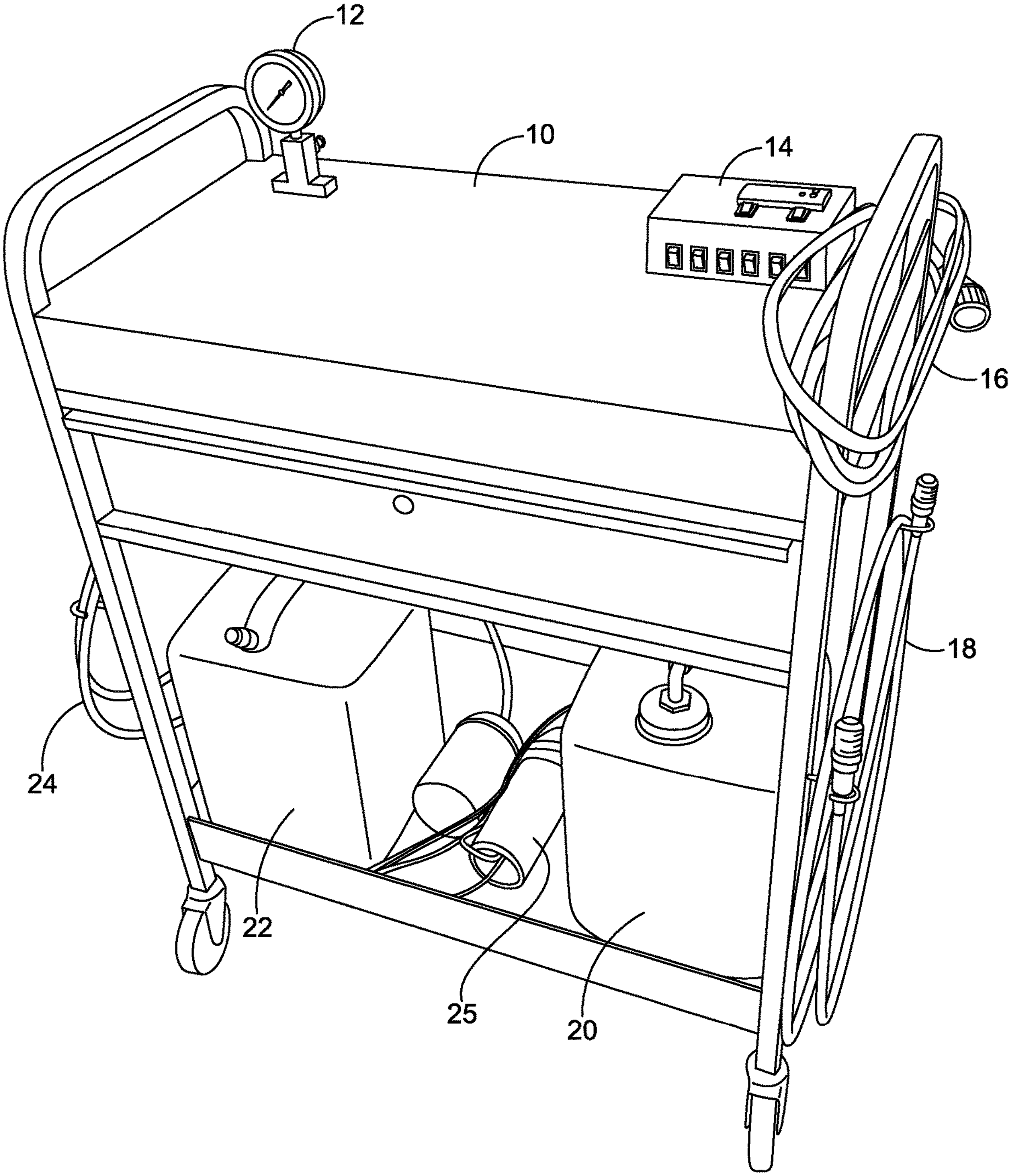
FIG. 1 depicts a system for treating engine components including fuel system components, in accordance with an embodiment of the present disclosure.

Looking now at FIG. 1, a system 10 that can be used for treating engine components, e.g., such as fuel-injectors, is provided, in accordance with an embodiment of the present disclosure. The system 10 is depicted as an assembly of multiple components. This configuration of components is intended to represent only one non-limiting selection, and numerous other configurations, including those having different components, different combinations of components, and/or different sub-combinations of components, are contemplated herein. The system 10 is suitable for performing the cleaning, maintenance, refurbishment, and/or diagnostic processes described herein, among others.

The system 10 includes a pressure gauge 12. The pressure gauge 12 can be used to monitor the pressure of a fluid supplied by the system 10, e.g., a fuel or cleaning solution, during a treatment process. The system 10 also includes a control box 14. The control box 14 can include a timer, and can also include a switching system that can be used to turn on and turn off a supply of fluid, e.g., fuel or cleaning solution, that is supplied by the system 10. The control box 14 can be connected to other components of the system 10, e.g., such as fluid pump 25, and can be used to control operation of these components in different aspects. The system 10 also includes a wiring harness 16. The wiring harness 16 can be connected to a fuel system component that is being treated. This connection can allow the control box 14 to operate components of the fuel system component, e.g., an electrical circuit, e.g., such as a 9-volt or 12-volt electrical circuit, that actuates fluid valves within a fuel-injector, in one aspect.

Looking still at FIG. 1, the system 10 includes a supply hose 18. The supply hose 18 can be used to supply fluid, e.g., fuel or cleaning solution, to connected engine or fuel system components. The system 10 also includes a supply reservoir 20. The supply reservoir 20 can be used to store cleaning solution or fuel. The system 10 also includes the fluid pump 25 which may be an electrically-powered fluid pump. The fluid pump 25 can be operated to pump fluid through the supply hose 18, e.g., at different pressures, depending on the operation being performed. For example, in different aspects, the fluid pump 25 can be configured to supply fluid at a pressure of at least 25 pounds-per-square-inch ("PSI"), at least 50 PSI, at least 75 PSI, at least 100 PSI, at least 125 PSI, at least 150 PSI, at least 175 PSI, at least 190 PSI, or at least 200 PSI, and/or any pressure therebetween, or another pressure. Similarly, under another measurement system, the fluid pump 25 can be configured to supply fluid at a pressure of at least 172369 Pascals ("Pa"), at least 344738 Pa, at least 517107 Pa, at least 689476 Pa, at least 861845 Pa, at least 1.034e+6 Pa, at least 1.207e+6 Pa, at least 1.31e+6 Pa, or at least 1.379e+6 Pa, and/or any pressure therebetween, or another pressure. Looking still at FIG. 1, the system 10 also includes a return hose 24 that connects to a return reservoir 22. The return reservoir 22 can be used to store returned fluid, e.g., fuel or cleaning solution, e.g., for recirculation, re-use, or disposal.

Figure 2:
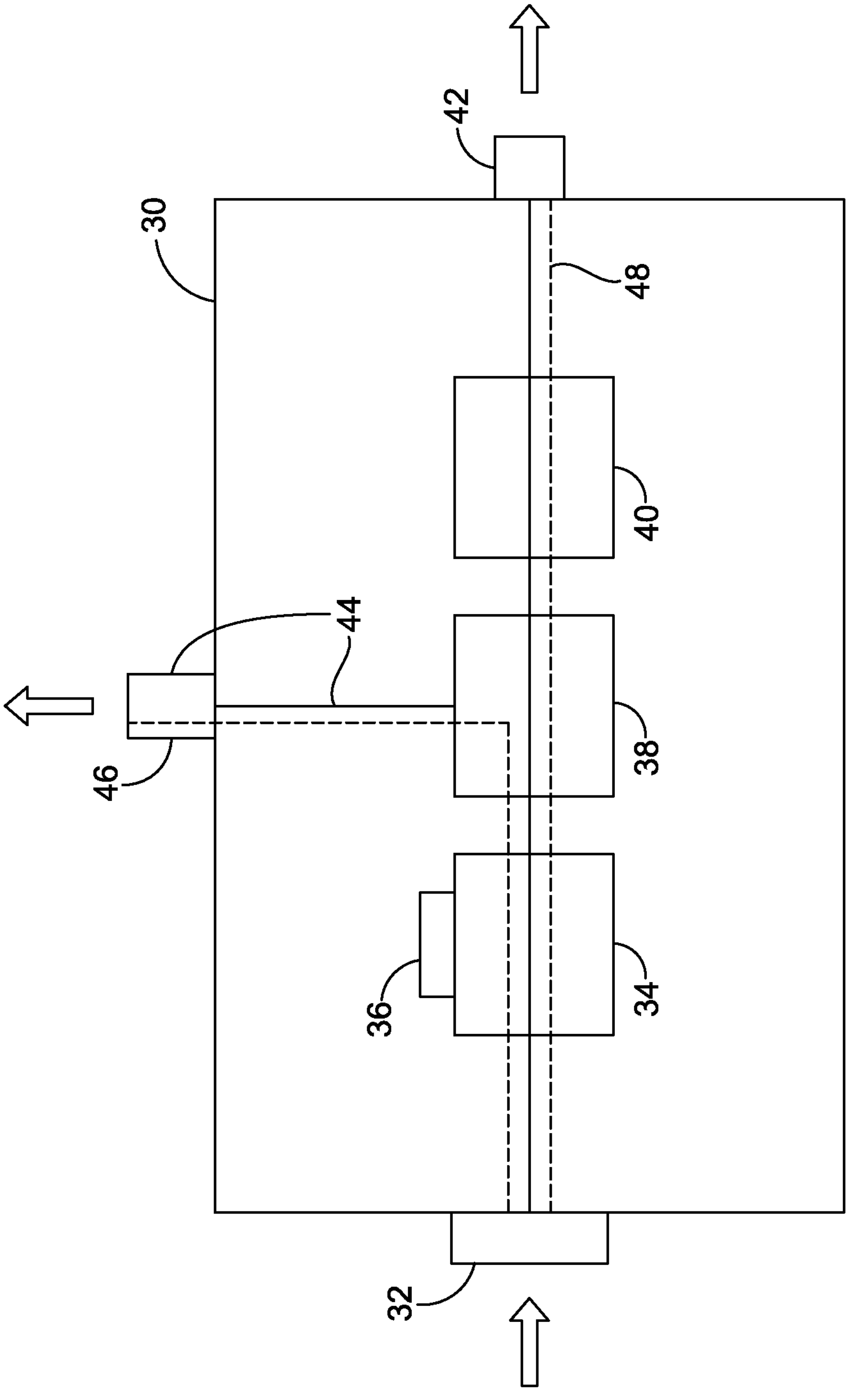
FIG. 2 depicts a generic diagram of a fuel system component, in accordance with an embodiment of the present disclosure.

Looking now at FIG. 2, a generic diagram of a fuel system component 30 is shown, in accordance with an embodiment of the present disclosure. The fuel system component 30 shown in FIG. 2 is represented generically for simplicity, clarity, and explanation purposes. In one instance, the fuel system component 30 may be a fuel-injector. As shown in FIG. 2, the fuel system component 30 includes a fluid-inlet 32. The fluid-inlet 32 can be connected to a source of fluid, e.g., fuel or cleaning solution, during a treatment process. The fluid-inlet 32 is in fluid communication with a fluid-valve 34. Fluid communication allows for the transfer of a volume of fluid from one location/component to another location/component. For example, in one instance, initiating fluid communication allows fluid to transfer from one area, e.g., a location upstream of a fluid-valve, to another area, e.g., a location downstream of a fluid-valve, among other possible scenarios.

The fluid-valve 34 can be opened/closed (or positioned therebetween) to control fluid communication between the fluid-valve 34 and a fluid chamber 38. To facilitate this opening and closing, an actuating component 36 is coupled to the fluid-valve 34. Thus, when the actuating component 36 is in a first configuration, the fluid-valve 34 is open (e.g., allowing for fluid transfer), and when the actuating component 36 is in a second configuration, the fluid-valve 34 is closed (e.g., preventing or limiting fluid transfer). This allows for the controlled passage of fluid through the fluid-valve 34 and into the fluid chamber 38. In some embodiments, the actuating component 36 may be an electrical component that operates based on electrical current (e.g., a needle that operates based on a 9-volt or 12-volt electrical circuit, a linear actuator, a linear motor, a solenoid, and/or another similar component). Additionally, the actuating component 36 may be pneumatic-powered, hydraulic-powered, or otherwise operate to generate mechanical motion to achieve the intended function of the actuating component 36.

Looking still at FIG. 2, it can be seen that the fluid chamber 38 is in fluid communication with a fluid-valve 40. The fluid chamber 38 is also in fluid communication with a fluid-outlet 44. The fluid-valve 40 can be configured to operate like the fluid-valve 34, e.g., being actuated by any of the components described above. Or, the fluid-valve 40 can be configured to operate based on a different principle, e.g., pressure. For example, in one instance, the fluid-valve 40 may open in response to experiencing a certain fluid pressure. Thus, when a minimum or threshold fluid pressure, e.g., such as at least 195 PSI (1.344e+6 Pa), at least 200 PSI (1.379 e+6 Pa), at least 205 PSI (1.413e+6 Pa), or at least 210 PSI (1.448e+6 Pa), or another minimum pressure is reached inside the fluid chamber 38, the fluid-valve 40 then opens in response, allowing fluid to pass through the fluid-valve 40 and to an outlet 42 where it can then disperse into components of an associated engine assembly (if connected). If the minimum or threshold fluid pressure to operate the fluid-valve 40 is not reached inside the fluid chamber 38, the introduced fluid can exit the fluid chamber 38 through the fluid outlet 44, and then exit the fuel system component 30.

The operation of the fluid-valve 40 based on minimum or threshold pressure can allow a cleaning solution to be supplied through the fuel system component 30 at such a pressure that it does not open the fluid-valve 40. This allows the cleaning solution to be supplied through the fuel system component 30 without the cleaning solution traveling through the fluid-valve 40 where it would then disperse into components of an associated engine assembly (if connected). This allows the process of cleaning or flushing the fuel system component 30 to be simplified because the fuel system component 30 does not necessarily need to be de-coupled, disconnected, and/or dissembled to prevent the introduction of cleaning solution into other components, among other benefits.

The configuration of the fuel system component 30 provides at least two fluid pathways, i.e., pathways 46, 48. There is a first fluid-pathway 46 that extends from the fluid-inlet 32, through the fluid-valve 34, through the fluid chamber 38, and through the fluid-outlet 44 and then out of the fuel system component 30. The first fluid-pathway 46 thus permits fluid to pass through the fuel system component 30 (e.g., in and then out) without passing through the fluid-valve 40 and the fluid-outlet 42 which would then disperse it into combustion components of an associated engine assembly (if connected). There is also a second fluid-pathway 48 extending from the fluid-inlet 32, through the fluid-valve 34, through the fluid chamber 38, and then through the fluid-valve 40 (e.g., which opens in response to a minimum fluid pressure being reached in the fluid chamber 38), and then through the fluid-outlet 42 where it can then disperse into combustion components of an associated engine assembly (if connected). The second fluid-pathway 48 thus permits fluid to pass through the fuel system component 30 (e.g., in and then out) such that it is dispersed into combustion components of an associated engine assembly (if connected), e.g., as part of normal fueling operation.

The dual-pathway configuration of the fuel system component 30 allows a fluid, e.g., a cleaning solution, to be supplied through the first fluid-pathway 46 without the fluid, e.g., the cleaning solution, being dispersed or introduced into combustion components of a connected engine assembly (where introduction of such fluid is not desirable). The first fluid-pathway 46 can thus be used for fluid processes that should not communicate with a connected engine assembly, e.g., cleaning, maintenance, diagnostics, and/or refurbishment, among others. The use of the first fluid-pathway 46 also allows these processes to be performed with limited need to disconnect, dissemble, and/or remove the fuel system component 30 from a connected engine assembly. The second fluid-pathway 48 can be used for fluid processes that can or should communicate with an associated engine assembly, e.g., continuous fueling that supports combustion during engine operation.

Figure 3:
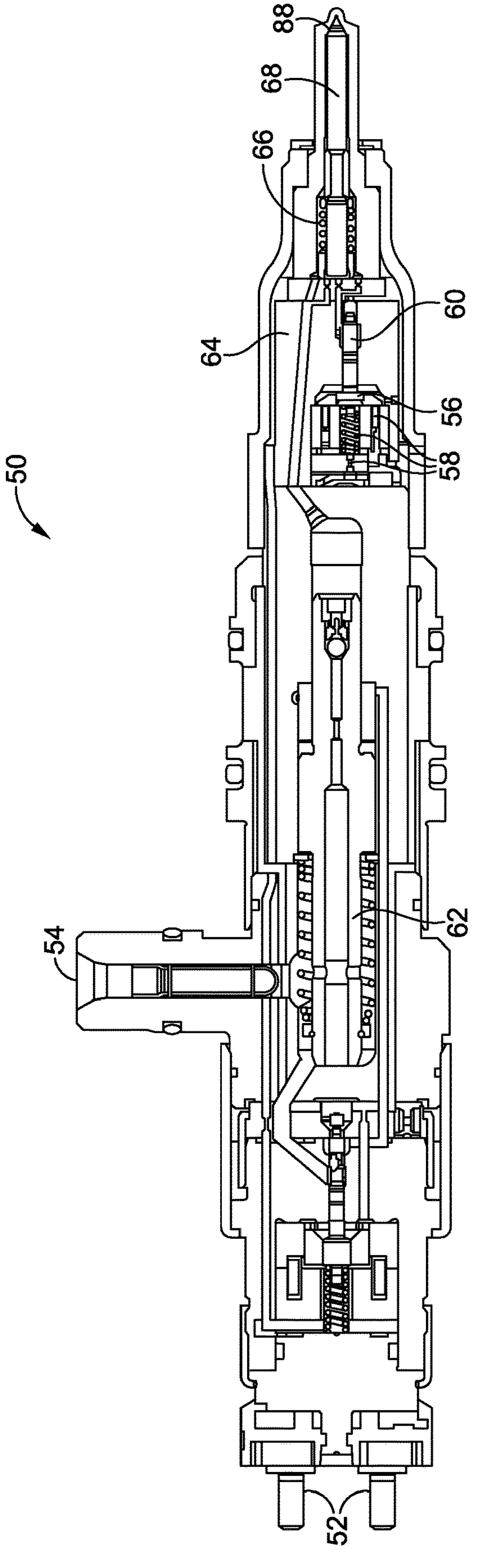
FIG. 3 depicts a cross-section of a fuel-injector, in accordance with an embodiment of the present disclosure.

Looking now at FIG. 3, a cross-section of a fuel-injector 50 is shown, in accordance with an embodiment of the present disclosure. The fuel-injector 50 is configured to selectively distribute fuel to components of a connected engine assembly, e.g., one that is gasoline-based, diesel-based, and/or one that uses bio-fuels. The fuel-injector 50 includes a fuel-inlet 52. The fuel-injector 50 also includes a fuel-outlet 54. The fuel-injector 50 also includes a fluid-valve 56 that includes a needle 60, e.g., a shiftable mechanical interference structure that translates through an orifice to open or restrict fluid communication. The fluid-valve 56 is adjustable between a closed configuration and an open configuration through shifting of the needle 60. The fluid-valve 56 is coupled to an electrical circuit 58 that controls the shifting of the needle 60. Thus, when electrical current is supplied through the electrical circuit 58, the needle 60 shifts from a first position to a second position where the fluid-valve 56 is open. This allows fluid to pass from the fluid-inlet 52, through a body 62 of the fuel-injector 50, and then through the fluid-valve 56 into a fluid chamber 64 that is internal to the fuel-injector 50. The fluid chamber 64 is adjacent to a fluid-valve 66 that also includes a needle 68. The needle 68 is shiftable to open and close the fluid-valve 66.

The fluid-valve 66 can be configured to operate like the fluid-valve 56, e.g., using an electrical circuit or other actuating component to shift the needle 68. Or, as with the aspect depicted in FIG. 3, the fluid-valve 66 can operate in response to fluid pressure. In such configurations, when a minimum or threshold pressure is reached in the fluid chamber 64 to operate the fluid-valve 66, the needle 68 shifts to open the fluid-valve 66, thereby allowing fluid to transfer from the fluid chamber 64 to a fluid-outlet 88. The fluid that passes through the fluid-outlet 88 can then disperse into combustion components of an associated engine assembly (if one is attached). The pressure threshold can differ depending on the configuration of the fuel-injector 50. For example, the minimum or threshold pressure for operating the fluid-valve 66 may be at least 200 PSI (1.379e+6 Pa). In this configuration, supplying fuel at 200 PSI (1.379e+6 Pa) or greater operates the fluid-valve 66, causing fuel to disperse into combustion components of an associated engine assembly (if one is attached). However, supplying cleaning solution through the fuel-injector 50 at a pressure lower than 200 PSI (1.379e+6 Pa) will not operate the fluid-valve 66, thereby keeping the cleaning solution internal to the fuel-injector 50 such that it does not disperse into combustion components of an associated engine assembly (if one is attached). The latter circumstance is suitable for a cleaning process in which a cleaning solution is supplied through the fuel-injector 50 but is not to be introduced into connected engine components, e.g., so that those engine components remain in operational condition for fueling/combustion.

Looking still at FIG. 3, the fuel-injector 50, like the fuel system component 30 shown in FIG. 2, provides a first fluid-pathway and a second fluid-pathway through the fuel-injector 50. The first fluid-pathway travels from the fluid-inlet 52, through the body 62, through the fluid-valve 56, through the fluid chamber 64, and then through the fluid-outlet 54. This pathway allows fluid to pass into, then through, and then out of the fuel-injector 50 (e.g., for return, recirculation, or disposal) without traveling through the fluid-valve 66 or the fluid-outlet 88 where it would otherwise disperse into combustion components of an associated engine assembly (if one is attached). The second fluid-pathway 48 travels from the fluid-inlet 52, through the body 62, through the fluid-valve 56, through the fluid chamber 64, and then through the fluid-valve 66, e.g., when a minimum fluid pressure is reached in the fluid chamber 64, and then through the fluid-outlet 88 where it can disperse into combustion components of an associated engine assembly (if one is attached).

The first fluid-pathway of the fuel-injector 50 can be used to pass a cleaning solution through the fuel-injector 50, e.g., during a process of cleaning, maintaining, and/or refurbishing the fuel-injector 50, while bypassing the second fluid-pathway that otherwise allows fluid to transfer into combustion components of an associated engine assembly (if one is attached). This allows a cleaning process to be performed on the fuel-injector 50 while the fuel-injector 50 remains at least partially attached and/or operably connected to an engine assembly. The ability to operate the fuel-injector 50 in this manner without removing it, e.g., in order to clean, maintain, refurbish, and/or diagnose the fuel-injector 50, is demonstrated to significantly reduce the time, complexity, and cost required to perform different operations, among other benefits.

Figure 4:
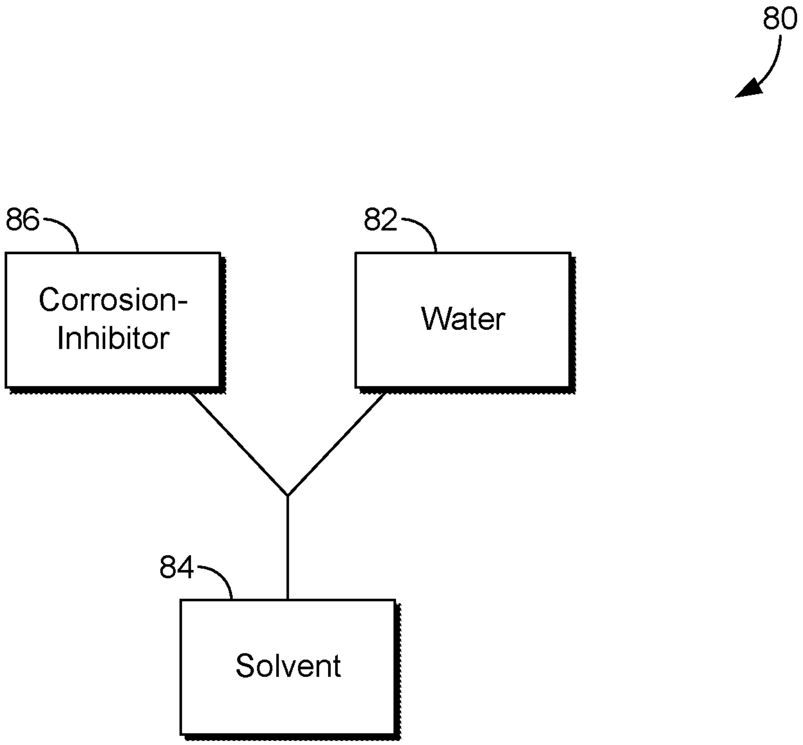
FIG. 4 depicts a generic diagram of a cleaning solution suitable for different processes described herein, in accordance with an embodiment of the present disclosure.

Looking now at FIG. 4, a diagram of a cleaning solution mixture 80 is shown, in accordance with an embodiment of the present disclosure. The mixture 80 shown in FIG. 4 is suitable for use with the different processes described herein. The mixture 80 depicted in FIG. 4 includes three solution elements, i.e., elements 82, 84, 86. These elements 82, 84, 86 include water ($H_2O$), solvent (e.g., alcohol, such as a monohydric alcohol, e.g., wood alcohol, ethyl alcohol, isopropyl alcohol, and/or butyl alcohol), and corrosion-inhibitor (e.g., a rust-inhibitor or oxidation-inhibitor, e.g., one that includes ethanolomines, such as monoethanolamine (MEA), dimethylethanolamine (DEMA), or triethylenetetramine (TETA), or a combination thereof). While a mixture of three solution elements is discussed in the present example, additional or fewer solution elements may be used to form a cleaning solution mixture in accordance with aspects described herein.

To facilitate the removal of deposits, e.g., salts, soaps, and other deposits that are at least partially hardened onto engine and fuel system components, the cleaning solutions described herein, e.g., the mixture 80 shown in FIG. 4, can include different types of organic solvents. For example, any organic solvents used in residential and/or commercial cleaning products, degreasers, oil dispersants, and the like, may be used in the cleaning solutions disclosed herein. In certain aspects, alcohol can be used, with primary alcohols being one such alcohol. The use of alcohol in a cleaning solution has been demonstrated to help expel water from engine components when performing the processes described herein, thereby helping to limit corrosion. In addition, the inclusion of corrosion-inhibitor in a cleaning solution that also includes water has been demonstrated to limit corrosion in components subsequent to performing the processes described herein.

In one embodiment, a cleaning solution that includes a mixture of approximately 49% water, approximately 49% alcohol (and/or other organic solvent(s)), and a remaining percentage, e.g., approximately 1-2%, of corrosion-inhibitor (measured by volume) has been demonstrated through testing to more efficiently and effectively dislodge and expel deposits (e.g., salts, soaps, and/or other deposits resulting from exposure to fuels, e.g., low-quality fuels or bio-based fuels) and also efficiently and effectively expel water (the retention of which inside components can increase corrosion) used in a cleaning process. In particular, the inclusion of 1-2% corrosion-inhibitor in a solution has been demonstrated to benefit the processes described herein by allowing components to be exposed to a cleaning solution, and in particular water, for longer while limiting corrosion that can result from exposure to such substances.

Figure 5:
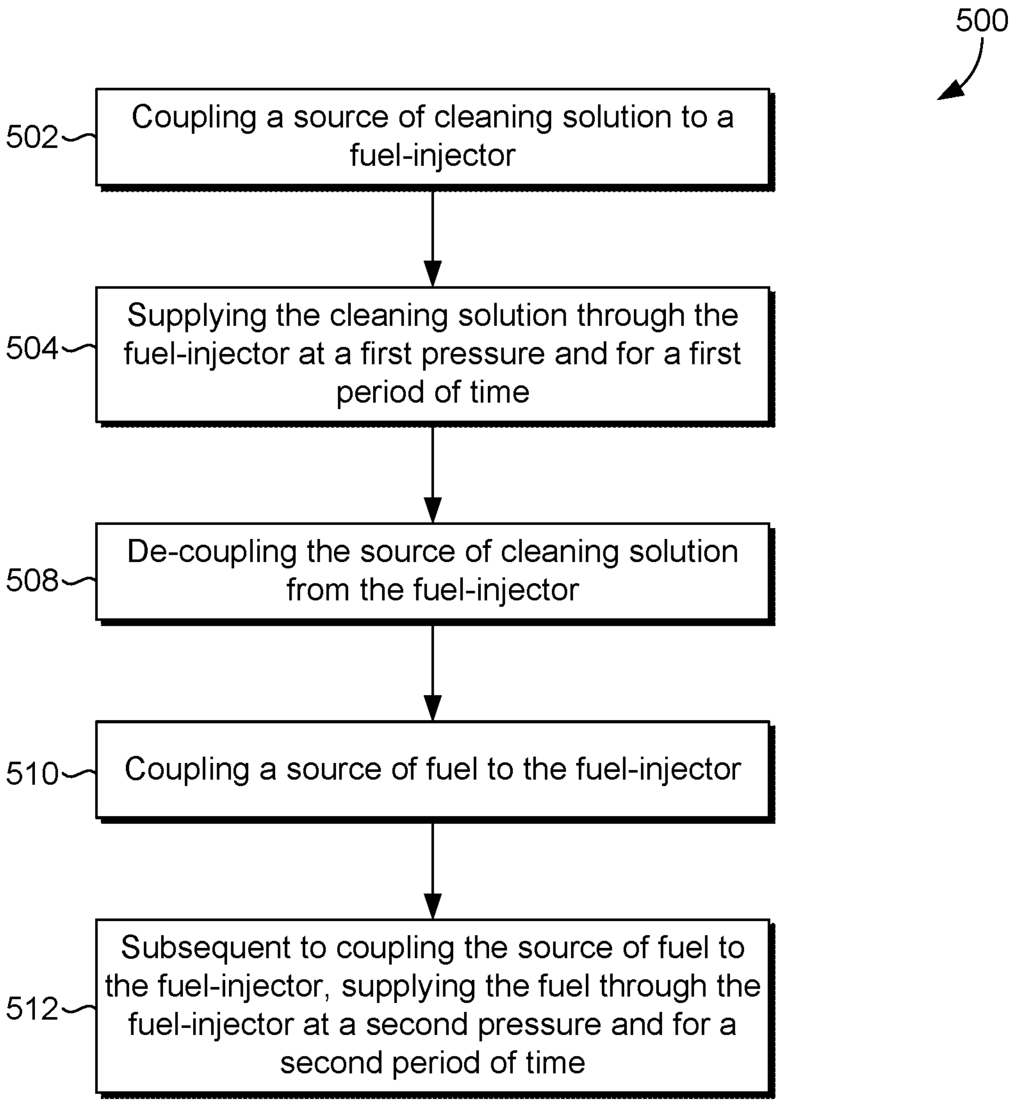
FIG. 5 depicts a block diagram of a method of cleaning a fuel system component, in accordance with an embodiment of the present disclosure.

Looking now at FIG. 5, a block diagram of a method 500 of cleaning a fuel system component, e.g., the fuel-injector 50 shown in FIG. 3, or another fuel system component, is provided, in accordance with an embodiment of the present disclosure. The method 500 includes blocks 502-510, but is not limited to this selection of elements. In block 502, the method 500 includes coupling a source of cleaning solution, e.g., any of the solutions discussed in connection with FIG. 4, to a fuel-injector, e.g., the fuel-injector 50 shown in FIG. 3. In block 504, the method 500 includes supplying the cleaning solution through the fuel-injector at a first pressure, e.g., 180-200 PSI, e.g., approximately 190 PSI, and for a first period of time, e.g., 10-180 seconds, e.g., for approximately 120 seconds. In block 506, the method 500 includes de-coupling the source of cleaning solution from the fuel-injector. In block 508, the method 500 includes coupling a source of fuel, e.g., gasoline, or diesel fuel, to the fuel-injector. In block 510, the method 500 includes, subsequent to coupling the source of fuel to the fuel-injector, supplying the fuel through the fuel-injector at a second pressure, e.g., 85-115 PSI, e.g., approximately 95 PSI, and for a second period of time, e.g., 60-180 seconds, e.g., approximately 120 seconds. The aforementioned sequence including pressures and times has been demonstrated through testing to improve the cleaning of fuel system components including through the removal of deposits in addition to limiting subsequent corrosion.

In additional embodiments, the method 500 can include additional elements. For example, subsequent to supplying the cleaning solution through the fuel-injector at the first pressure and for the first period of time, the supplying of the cleaning solution through the fuel-injector may be discontinued for a second period of time, e.g., 60-180 seconds, e.g., approximately 120 seconds. This has also been demonstrated through testing to improve the cleaning of fuel system components (e.g., by allowing the cleaning solution to soak inside the fuel system component). In addition, the sequence of supplying the cleaning solution through the fuel-injector and the subsequent discontinuing of the supplying of the cleaning solution through the fuel-injector can be repeated/cycled a plurality of times, e.g., in particular at least four times, prior to de-coupling the source of cleaning solution from the fuel-injector and connecting a source of fuel to the fuel-injector. This is also demonstrated through testing to improve the cleaning of fuel system components including through the removal of deposits.

Figure 6:
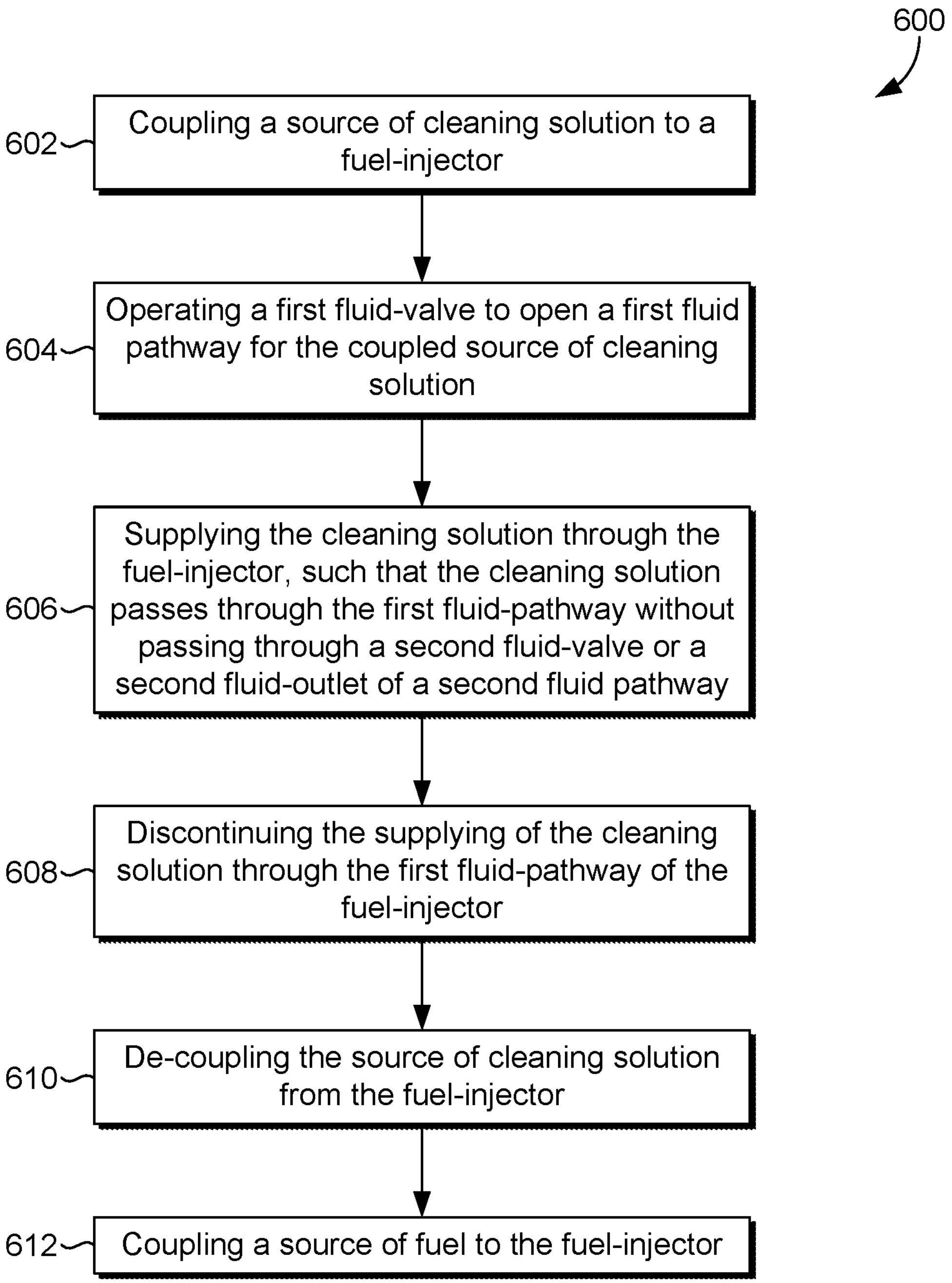
FIG. 6 depicts a block diagram of a method of cleaning a fuel system component, in accordance with an embodiment of the present disclosure.

Looking now at FIG. 6, a block diagram of a method 600 of cleaning a fuel system component, e.g., the fuel-injector 50 shown in FIG. 3, while it remains connected to an engine assembly is provided, in accordance with an embodiment of the present disclosure. The method 600 includes blocks 602-612, but is not limited to this selection of elements. In block 602, the method 600 includes coupling a source of cleaning solution, e.g., any of the cleaning solutions described in connection with FIG. 4, to a fuel-injector, e.g., the fuel-injector 50 shown in FIG. 3. In block 604, the method 600 includes operating a first fluid-valve, e.g., the fluid-valve 56 shown in FIG. 3, to open a first fluid-pathway, e.g., the fluid-pathway 46 shown in FIG. 2, for the coupled source of cleaning solution. In block 606, the method 600 includes supplying the cleaning solution through the fuel-injector, such that the cleaning solution passes through the first fluid-pathway without passing through a second fluid-valve, e.g., the fluid-valve 66 shown in FIG. 3, or a second fluid-outlet, e.g., the fluid-outlet 88 shown in FIG. 3, of a second fluid-pathway, e.g., the fluid-pathway 48 shown in FIG. 2. In block 608, the method 600 includes discontinuing the supplying of the cleaning solution through the first fluid-pathway. In different aspects, the supplying of the cleaning solution (e.g., to agitate and flush deposits from a fuel system component) and the subsequent discontinuing of the supplying of the cleaning solution (e.g., to allow the cleaning solution to rest inside a fuel system component and dissolve deposits) can be repeated a plurality of times for enhanced effect. For example, in one instance, providing at least four cycles of cleaning solution supplying and discontinuing has been demonstrated to significantly eliminate deposits from fuel-system components. In block 610, the method 600 includes de-coupling the source of cleaning solution from the fuel-injector. In block 612, the method 600 includes coupling a source of fuel, e.g., gasoline, diesel fuel, and/or a source of bio-based fuel, to the fuel-injector. The fuel may then be flushed through the fuel-injector at a lower pressure (e.g., since agitation is not as necessary) and for a same or shorter period of time (e.g., since a cleaning solution with solvent and corrosion-inhibitor limits the amount of non-fuel remaining in the fuel-injector).

Figure 7:
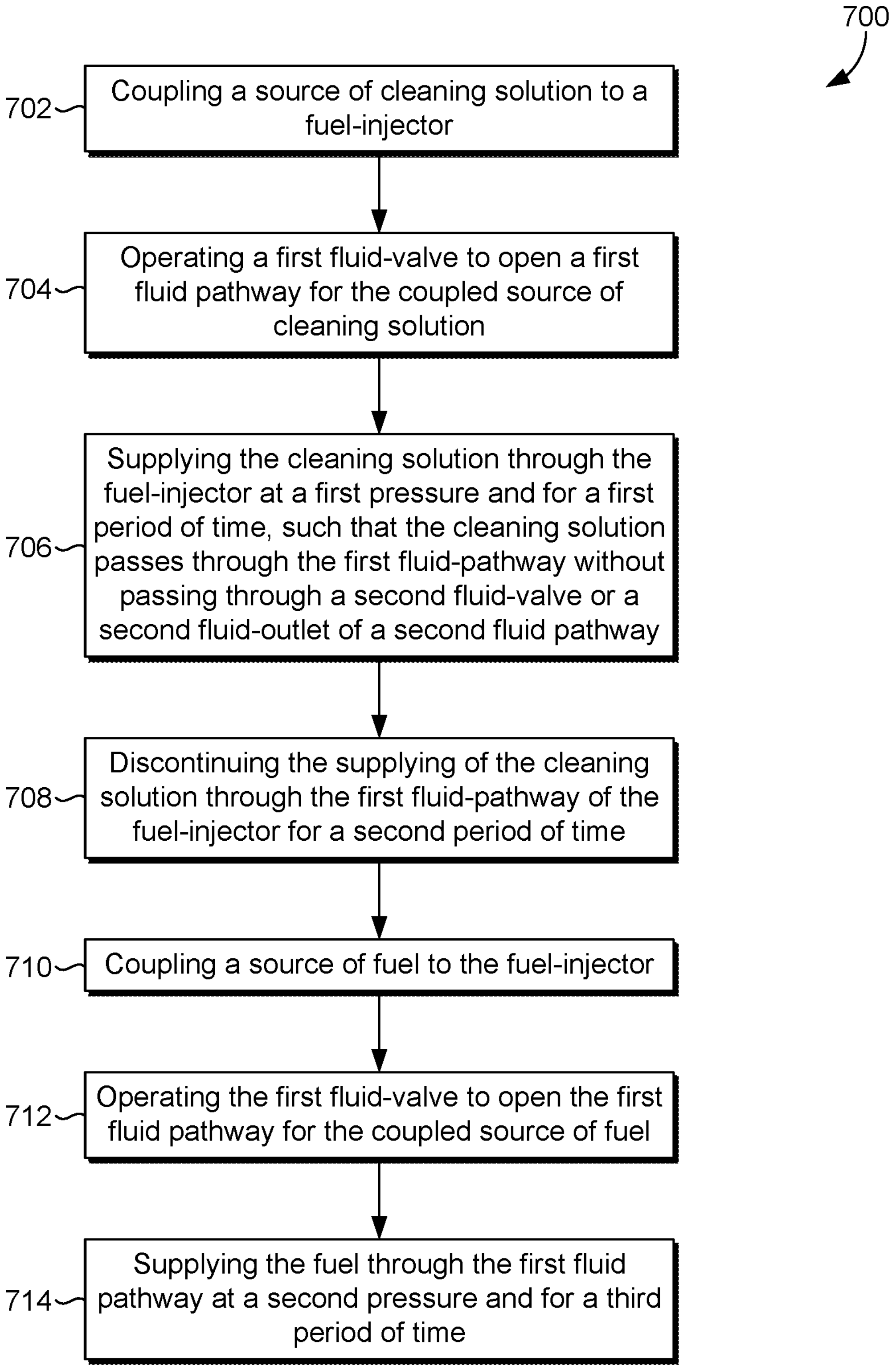
FIG. 7 depicts a block diagram of a method of cleaning a fuel system component, in accordance with an embodiment of the present disclosure.

Looking now at FIG. 7, a block diagram of a method 700 of cleaning a fuel-injector, e.g., the fuel-injector 50 shown in FIG. 3, that is coupled to an engine assembly, e.g., a gasoline-powered or diesel-powered combustion engine, e.g., forming part of a car, truck, heavy machinery, or the like, is provided, in accordance with an embodiment of the present disclosure. The method 700 includes blocks 702-714, but is not limited to this selection of elements. In block 702, the method 700 includes coupling a source of cleaning solution, e.g., any of the cleaning solutions described in connection with FIG. 4, to the fuel-injector. In block 704, the method 700 includes operating a first fluid-valve, e.g., the fluid-valve 56 shown in FIG. 3, to open a first fluid-pathway, e.g., the fluid-pathway 46 shown in FIG. 2, for the coupled source of cleaning solution. In block 706, the method 700 includes supplying the cleaning solution through the fuel-injector at a first pressure and for a first period of time, e.g., such as approximately 195 PSI for 30-180 seconds, such that the cleaning solution passes through the first fluid-pathway without passing through a second fluid-valve, e.g., the fluid-valve 66 shown in FIG. 3, or a second fluid-outlet, e.g., the fluid-outlet 88 shown in FIG. 3, of a second fluid-pathway, e.g., the fluid-pathway 48 shown in FIG. 2. In block 708, the method 700 includes discontinuing the supplying of the cleaning solution through the first fluid-pathway of the fuel-injector for a second period of time, e.g., 30-180 seconds. In block 710, the method 700 includes coupling a source of fuel, e.g., gasoline, or diesel fuel, to the fuel-injector. In block 712, the method 700 includes operating the first fluid-valve to open the first fluid-pathway for the coupled source of fuel. In block 714, the method 700 includes supplying the fuel through the first fluid-pathway at a second pressure and for a third period of time, e.g., such as approximately 95 PSI for 10-180 seconds.

Figure 8A:
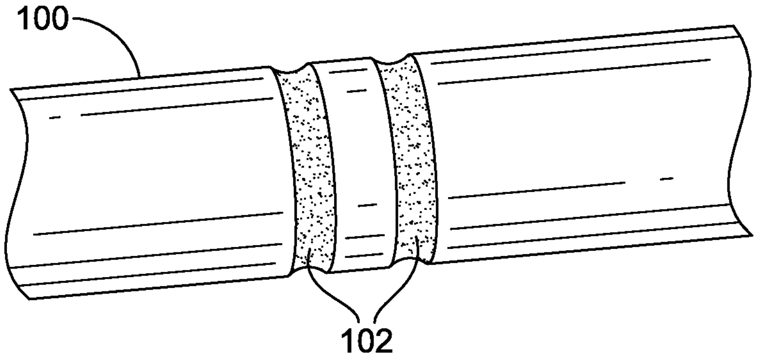
FIGS. 8A and 8B depict part of a fuel system component before and after a cleaning process is performed, in accordance with an embodiment of the present disclosure.
Figure 8B:
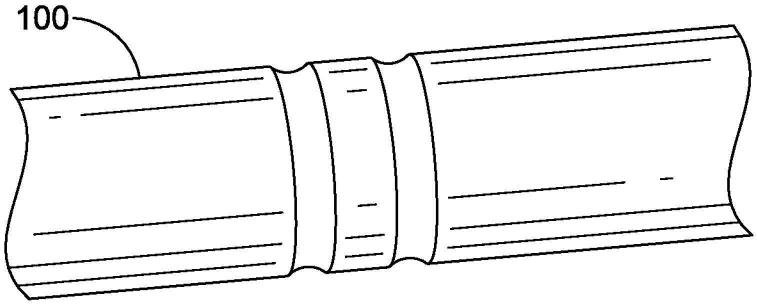

Looking now at FIGS. 8A and 8B, part of a fuel system component 100 depicted before and after a cleaning process is performed is shown, in accordance with an embodiment of the present disclosure. The fuel system component 100 may be a fuel-injector, e.g., one used with a gasoline-powered or diesel-powered engine. FIG. 8A shows the fuel system component 100 prior to a cleaning, maintenance, and/or refurbishment process as described herein being performed. It can be seen in FIG. 8A that the component 100 includes deposits 102 (e.g., salts, soaps, or other fuel-originated deposits) that are at least partially hardened onto the fuel system component 100. FIG. 8B shows the fuel system component 100 after a cleaning, maintenance, and/or refurbishment process as described herein has been performed. It can be seen in FIG. 8B that the deposits 102 on the fuel system component 100 are significantly reduced, expelled, and/or eliminated. The cleaning processes, sequences, and solutions described herein, whether used once or a plurality of times, e.g., at least four times, can thus significantly improve the removal of deposits, and thus improve the function and durability of engine and fuel system components.

In additional embodiments, the cleaning, maintenance, and refurbishment processes described herein can be used to identify defective, malfunctioning, and/or inoperable fuel system components, e.g., fuel-injectors. For example, during a process of cleaning a fuel-injector, e.g., using a cleaning solution that is supplied through a first fluid-pathway at a first pressure, and then discontinued, and then subsequently a source of fuel is connected to the fuel-injector, the operation of the fuel-injector and/or pressure measurements can be used to determine if the fuel-injector is defective, e.g., in comparison to other fuel-injectors. For example, if a pressure reading of a fluid (e.g., cleaning solution or fuel) inside the fuel injector does not match a pressure used to administer the fluid, or if the pressure does not change when a fluid is supplied to the fuel-injector at a set pressure, this can indicate a defective or faulty component is being processed. The processes herein can allow for identification of a defective component without removal/disassembly of the actual component, and/or without removal and replacement of all such components on an assembly (due to inability to detect which component is defective), thereby reducing the complexity, cost, and uncertainty in such processes.

In additional embodiments, the cleaning, maintenance, refurbishment, and/or diagnostic processes described herein can be used on other engine components, e.g., other fuel system components or combustion components, e.g., including those inside the engines themselves. For example, the processes described herein can be used on a high-pressure pump of an engine to provide similar cleaning, maintenance, and/or refurbishment results with similar benefits.

Clause 1. A method of cleaning a fuel-injector comprising coupling a source of cleaning solution to the fuel-injector; supplying the cleaning solution through the fuel-injector at a first pressure and for a first period of time; de-coupling the source of cleaning solution from the fuel-injector; coupling a source of fuel to the fuel-injector; and subsequent to coupling the source of fuel to the fuel-injector, supplying the fuel through the fuel-injector at a second pressure and for a second period of time, wherein the first pressure is greater than the second pressure, and wherein the first period of time is greater than the second period of time.

Clause 2. The method of clause 1, further comprising, subsequent to supplying the cleaning solution through the fuel-injector at the first pressure and for the first period of time, discontinuing the supplying of the cleaning solution through the fuel-injector for a third period of time.

Clause 3. The method of clause 1 or 2, further comprising repeating the supplying of the cleaning solution through the fuel-injector and the subsequent discontinuing of the supplying of the cleaning solution through the fuel-injector a plurality of times prior to de-coupling the source of cleaning solution from the fuel-injector.

Clause 4. The method of any of clauses 1-3, wherein the plurality of times is at least four times, and wherein the first period of time and the third period of time are approximately equal.

Clause 5. The method of any of clauses 1-4, wherein the second period of time is at least 20 seconds.

Clause 6. The method of any of clauses 1-5, wherein the first pressure is at least approximately 190 PSI, and wherein the second pressure is at least approximately 95 PSI.

Clause 7. The method of any of clauses 1-6, wherein the first pressure and the second pressure differ by 30-100 PSI.

Clause 8. The method of any of clauses 1-7, wherein during the supplying of the cleaning solution through the fuel-injector, the fuel-injector remains attached to an engine assembly, and wherein the cleaning solution is supplied through a first fluid-pathway in the fuel-injector that bypasses a second fluid-pathway in the fuel-injector that is capable of introducing fluid to combustion components of the attached engine assembly.

Clause 9. The method of any of clauses 1-8, wherein the cleaning solution comprises a mixture of water, alcohol, and corrosion-inhibitor.

Clause 10. The method of any of clauses 1-9, wherein the mixture comprises approximately 1% corrosion-inhibitor by volume, and wherein a remaining portion of the mixture comprises approximately equal parts water and alcohol by volume.

Clause 11. A method of cleaning a fuel-injector while it remains attached to an engine assembly comprising coupling a source of cleaning solution to the fuel-injector, wherein the fuel-injector includes a first fluid-pathway that comprises a first fluid-inlet, a first fluid-valve, and a first fluid-outlet, and wherein the fuel-injector further includes a second fluid-pathway that comprises the first fluid-inlet, the first fluid-valve, and a second fluid-valve that controls fluid communication to a second fluid-outlet that communicates with combustion components of the attached engine assembly; operating the first fluid-valve to open the first fluid-pathway for the coupled source of cleaning solution; supplying the cleaning solution through the fuel-injector, such that the cleaning solution passes through the first fluid-pathway without passing through the second fluid-valve or the second fluid-outlet of the second fluid-pathway; discontinuing the supplying of the cleaning solution through the first fluid-pathway of the fuel-injector; de-coupling the source of cleaning solution from the fuel-injector; and coupling a source of fuel to the fuel-injector.

Clause 12. The method of clause 11, wherein the first fluid-valve is operatively connected to an electrical circuit that controls the opening of the first fluid-valve in response to an electrical current being supplied through the electrical circuit.

Clause 13. The method of clause 11 or 12, wherein the second fluid-valve opens in response to being exposed to a first fluid pressure, and wherein the cleaning solution is supplied through the fuel-injector at a second fluid pressure that is less than the first fluid pressure.

Clause 14. The method of any of clauses 11-13, wherein the cleaning solution comprises a mixture of water, alcohol, and corrosion-inhibitor.

Clause 15. The method of any of clauses 11-14, further comprising repeating the supplying of the cleaning solution through the fuel-injector and the subsequent discontinuing of the supplying of the cleaning solution through the fuel-injector a plurality of times prior to de-coupling the source of cleaning solution from the fuel-injector.

Clause 16. A method of cleaning a fuel-injector while it remains attached to an engine assembly comprising coupling a source of cleaning solution to the fuel-injector, wherein the fuel-injector includes a first fluid-pathway that comprises a first fluid-inlet, a first fluid-valve, and a first fluid-outlet, and wherein the fuel-injector further includes a second fluid-pathway that comprises the first fluid-inlet, the first fluid-valve, and a second fluid-valve that controls fluid communication to a second fluid-outlet that communicates with combustion components of the attached engine assembly; operating the first fluid-valve to open the first fluid-pathway for the coupled source of cleaning solution; supplying the cleaning solution through the fuel-injector at a first pressure and for a first period of time, such that the cleaning solution passes through the first fluid-pathway without passing through the second fluid-valve or the second fluid-outlet of the second fluid-pathway; discontinuing the supplying of the cleaning solution through the first fluid-pathway of the fuel-injector for a second period of time; coupling a source of fuel to the fuel-injector; operating the first fluid-valve to open the first fluid-pathway for the coupled source of fuel; and supplying the fuel through the first fluid-pathway at a second pressure and for a third period of time, wherein the first pressure is greater than the second pressure, and wherein the first period of time is greater than the third period of time.

Clause 17. The method of clause 16, further comprising repeating the supplying of the cleaning solution through the fuel-injector and the subsequent discontinuing of the supplying of the cleaning solution through the fuel-injector, a plurality of times.

Clause 18. The method of clause 16 or 17, wherein the cleaning solution comprises a mixture of water, alcohol, and corrosion-inhibitor.

Clause 19. The method of any of clauses 16-18, further comprising subsequent to supplying the fuel through the first fluid-pathway, decoupling the source of fuel from the fuel-injector; and re-attaching a fuel line associated with the engine assembly to the fuel-injector.

Clause 20. The method of any of clauses 16-19, further comprising identifying defective operation of the fuel-injector based on an incorrect pressure in the fuel-injector during the supplying of the cleaning solution.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C." In addition, this disclosure may use the term "and/or" which may refer to any one or combination of the associated elements.

The subject matter of this disclosure has been described in relation to particular embodiments, which are intended in all respects to be illustrative rather than restrictive. In this sense, alternative embodiments will become apparent to those of ordinary skill in the art to which the present subject matter pertains without departing from the scope hereof. In addition, different combinations and sub-combinations of elements disclosed, as well as use and inclusion of elements not shown, are possible and contemplated as well.

What is claimed is:

1. A system for cleaning a fuel-injector that remains attached to an engine, the system comprising a source of fuel, a source of cleaning solution, a pump, and a control box configured to control operation of the pump, the system configured to:

in a first configuration, supply the cleaning solution using the pump, such that the cleaning solution passes into, through, and out of the fuel-injector, without the cleaning solution passing into the engine, to thereby clean the fuel-injector; and in a second configuration, supply the fuel using the pump, such that the fuel passes into, through, and out of the fuel-injector, without the fuel passing into the engine, to thereby restore fuel flow through the fuel-injector, wherein, in the first configuration, a second fluid-valve is configured to supply the cleaning solution at a pressure that is below a threshold pressure which causes the fuel-injector to open fluid communication into the engine.

2. The system of claim 1, wherein the fuel-injector comprises a first fluid-valve that is operated with an electrical circuit and the second fluid-valve that is pressure-operated and that opens in response to the threshold pressure thereby allowing the fluid communication into the engine.

3. The system of claim 2, wherein, in the first configuration, the cleaning solution is communicated through only the first fluid-valve and out of the fuel-injector.

4. The system of claim 1, wherein the cleaning solution comprises a mixture of water, alcohol, and corrosion inhibitor.

5. The system of claim 1, wherein the system is configured such that, in the first configuration, the cleaning solution passing out of the fuel-injector is returned to the source of cleaning solution.

6. A configuration for cleaning a fuel injector, the configuration comprising:

an engine;

a fuel-injector that is attached to the engine;

a system for cleaning the fuel-injector while it remains attached to the engine, the system comprising:

a source of fuel, a source of cleaning solution, a pump, and a control box configured to control operation of the pump, the system configured to:

in a first configuration, supply the cleaning solution using the pump, such that the cleaning solution passes into, through, and out of the fuel-injector, without the cleaning solution passing into the attached engine, to thereby clean the fuel-injector; and in a second configuration, supply the fuel using the pump, such that the fuel passes into, through, and out of the fuel-injector, without the fuel passing into the attached engine, to thereby restore fuel flow through the fuel-injector.

7. The configuration of claim 6, wherein the fuel-injector comprises a first fluid-valve that is operated with an electrical circuit and a second fluid-valve that is pressure-operated, wherein opening the second fluid-valve allows fluid communication from the fuel-injector into combustion components of the attached engine.

8. The configuration of claim 7, wherein, in the first configuration, the cleaning solution is supplied at a pressure that is below a threshold pressure that opens the second fluid-valve, such that the cleaning solution does not communicate through the second fluid-valve into the combustion components of the attached engine.

9. The configuration of claim 6, wherein the cleaning solution comprises a mixture of water, alcohol, and corrosion inhibitor.

10. The configuration of claim 6, wherein, in the first configuration, a fluid-valve supplies the cleaning solution through the fuel-injector below a threshold pressure such that the cleaning solution bypasses a pathway into the attached engine.

* * * * *